United States Patent [19]

Anderson et al.

[11] Patent Number: 4,685,552
[45] Date of Patent: Aug. 11, 1987

[54] MACHINE FOR ORIENTATING AND DELIVERING TAPERED ARTICLES

[76] Inventors: Ronald L. Anderson, 3641 Agate St.; Harry T. Kessler, Jr., 4460 Mill, both of Eugene, Oreg. 97405

[21] Appl. No.: 771,498

[22] Filed: Aug. 30, 1985

[51] Int. Cl.[4] .............................................. B65G 47/24
[52] U.S. Cl. .................................. 198/389; 198/456; 198/773
[58] Field of Search ............... 198/389, 396, 400, 773, 198/463.5, 456, 394; 209/674; 193/44, 48

[56] References Cited

U.S. PATENT DOCUMENTS

| | | | |
|---|---|---|---|
| 2,840,220 | 6/1958 | Antonelli | 193/44 |
| 3,367,477 | 2/1968 | Leth | 198/456 |
| 3,463,292 | 8/1969 | Booij et al. | 198/33 |
| 3,487,904 | 1/1970 | Aguilar | 193/43 |
| 3,561,582 | 2/1971 | Smith | 198/773 |
| 3,605,983 | 9/1971 | Oldershaw | 198/400 |
| 3,661,240 | 5/1972 | Baumann | 198/773 |
| 3,797,639 | 3/1974 | Smith | 198/33 |
| 3,811,550 | 5/1974 | Ajero | 198/272 |
| 3,923,143 | 12/1975 | Green | 198/773 |
| 3,985,221 | 10/1976 | Lueders | 198/463.5 |
| 4,056,187 | 11/1977 | Ajero | 198/400 |
| 4,069,909 | 1/1978 | Altman et al. | 198/773 |
| 4,075,087 | 2/1978 | Gerrans | 209/674 |

FOREIGN PATENT DOCUMENTS 967454  8/1964  United Kingdom .

Primary Examiner—Joseph E. Valenza
Attorney, Agent, or Firm—James D. Givnan, Jr.

[57] ABSTRACT

A conveyor with reciprocating flights elevates tapered articles to an elevated discharge point. Conveyor flights have powered elements thereon to move articles lengthwise of the flight into endwise abutment with a flight mounted stop. The conveyor has discharge flights delivering singular articles to cooperating oscillating and pinch plate components which serve to detain the larger end of the article to tip same for subsequent endwise contact of an article end with a transversely running belt surface which contributes to article small end first orientation. A reciprocating surface serves to position the articles in mutual alignment for subsequent simultaneous delivery of the articles to a conveyor for further article processing.

24 Claims, 5 Drawing Figures

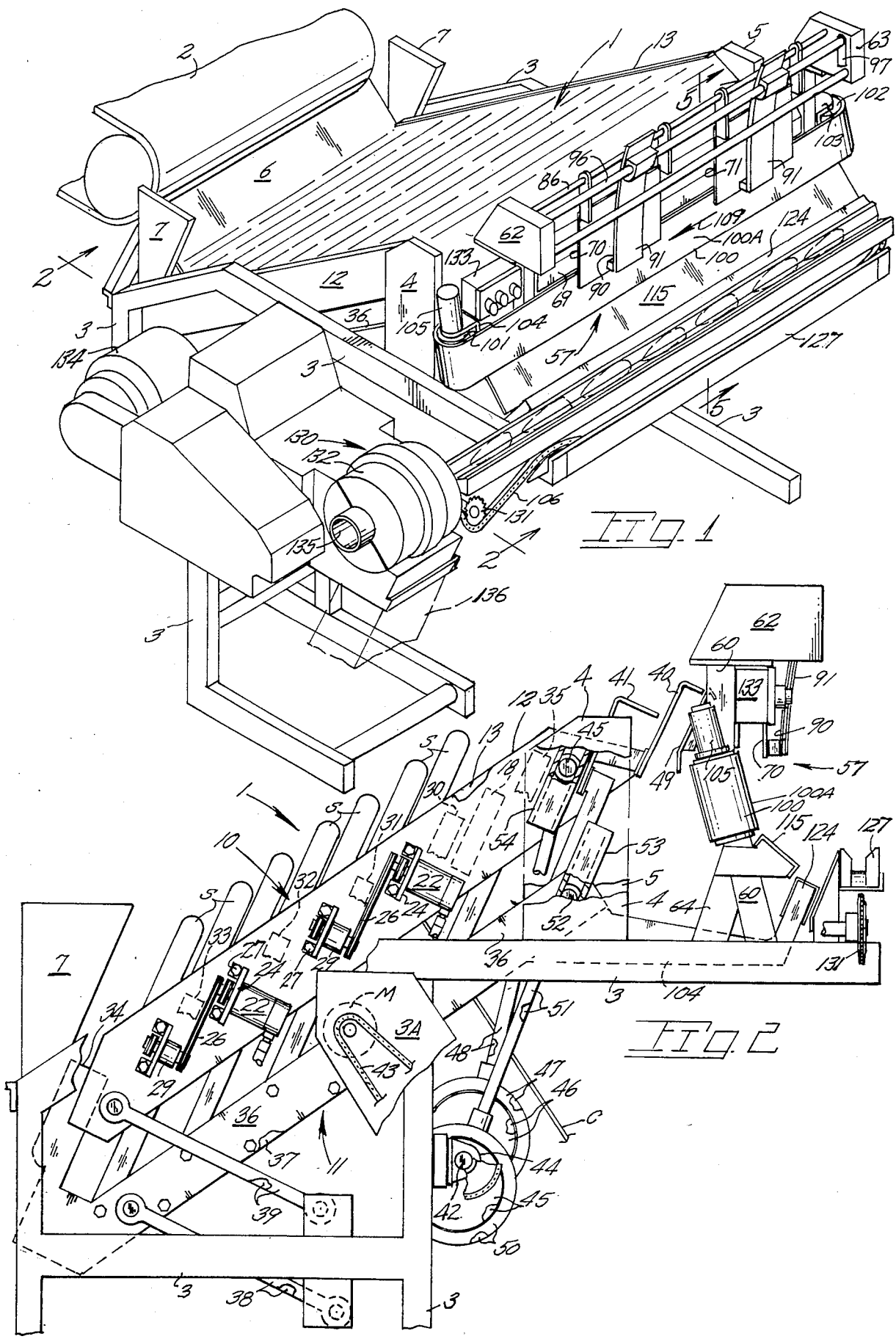

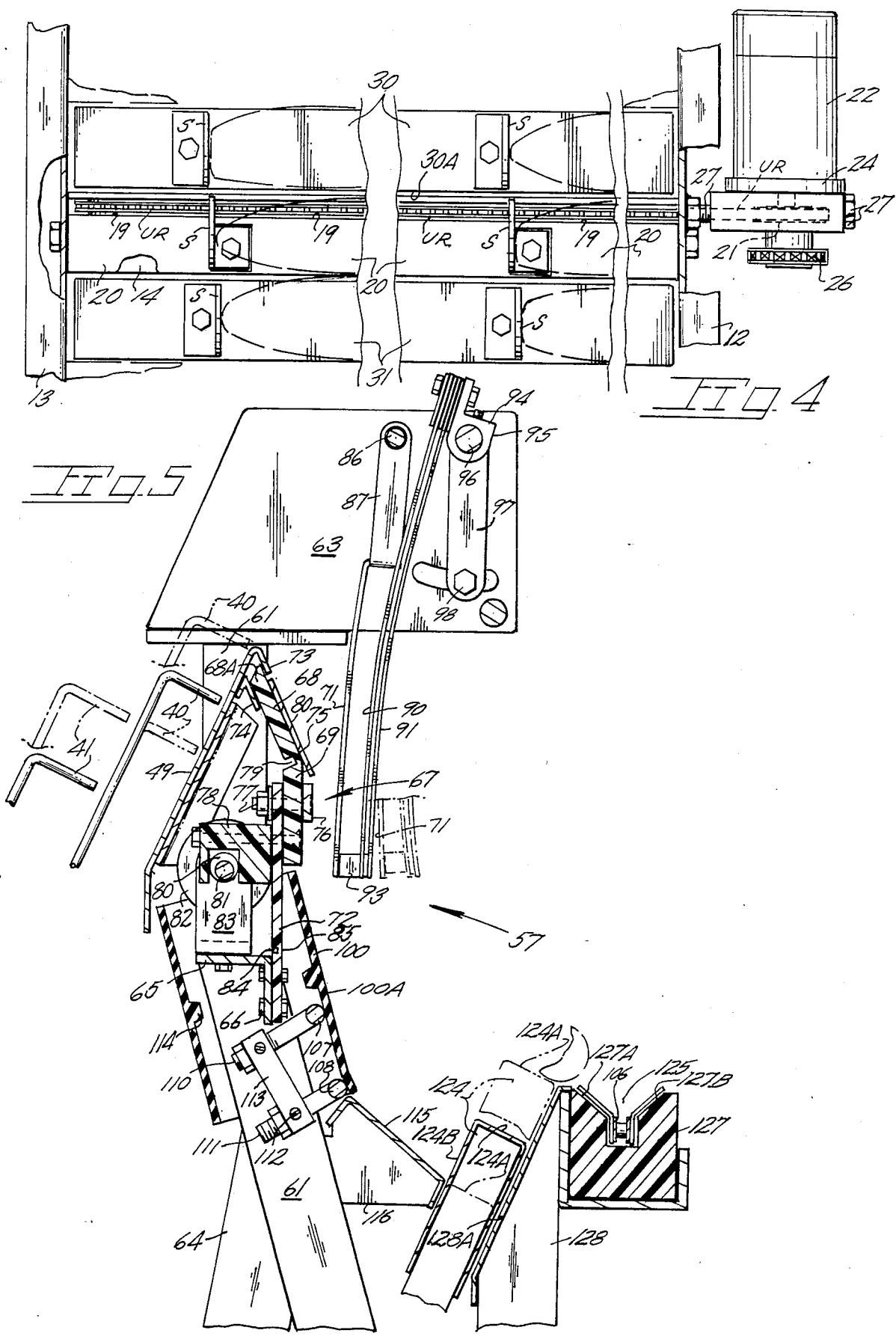

MACHINE FOR ORIENTATING AND DELIVERING TAPERED ARTICLES

BACKGROUND OF THE INVENTION

The present invention pertains generally to food article processing equipment and particularly to a machine for the consecutive delivery of tapered articles such as ears of corn to a kernel removing cutter.

In wide use today in corn processing plants are kernel removing cutters which include powered rolls which drive an ear of corn, without husk, past a powered rotary blade assembly. The efficiency of such, termed cutters, is reduced by the ear being presented butt end first to the blade assembly as the blade components are spring urged to a contracted starting position to assure kernel removal from the ear smaller end. Normally the tapered ear biases the cutter blade assembly toward an open condition. Entrance of an ear butt end first presents a blunt, large diameter end which the cutter can accommodate but at less than optimum efficiency resulting in the discharged ear having uncut kernels left thereon. Butt first entrance of the ears into the cutter tends to disrupt continuous ear processing.

U.S. Pat. Nos. 3,811,550 and 4,056,187 to F. S. Ajero are based on equipment intended to orientate ears of corn nose end first to alleviate the above noted problems. While the earlier patented equipment was an improvement over the hand feeding of ears to a cutter machine, serious problems still remained in achieving a high orientation rate and also the consecutive single file presentation of ears to the cutter machine. Ears discharged from a feed conveyor simultaneously in the earlier machines would pass down through the orientating phase of the machine and be deposited on a conveyor serving the cutter machine. The ears were orientated by a drum or other moving surface in the first Ajero patent while the second Ajero patent utilized an upright, reciprocating plate which cooperated with a yieldable, article pinching surface to slow the large or butt end of a gravitating ear while the smaller or nose end of the ear gravitated ahead of the butt end. The ear was then released for uninterrupted passage onto a conveyor which also received additional ears at random intervals. Accordingly, even if orientation was achieved, a problem existed in providing a proper ear interval on the conveyor.

U.S. Pat. No. 3,487,904 is of interest in that it discloses a machine for orientating pears wherein the larger end of a gravitating pear is impeded while the smaller end gravitates therepast.

Known conveyor arrangements, such as that shown in the earlier noted U.S. Pat. No. 3,811,550, rely on belt mounted cleats to engage and elevate an ear out of a random array of ears which arrangement does not provide consistent ear delivery to the orientating part of the machine. The machine in U.S. Pat. No. 3,797,639 shows a flight conveyor and article orientating means in combination.

SUMMARY OF THE PRESENT INVENTION

The present invention is embodied in a machine for orientating tapered articles and presenting same to a processing instrumentality singly at a rapid rate.

A flight conveyor receives husked ears and elevates them in a manner so as to consistently discharge single ears into the orientating portion of the machine. The conveyor is generally of the shuffle or flight feeder type characterized by parallel, reciprocating flights which progressively advance the articles upwardly. Importantly, certain of the flights include novel positioning means to move an ear along a flight top edge and finally to a location on a subsequent flight where the singular ear will be retained on the flight while other companion ears and fragments on the flight will be removed.

In one embodiment the present conveyor simultaneously discharges two isolated or singular ears into the orientating part of the machine. Provision is also made in the flight conveyor portion of the machine for removing article fragments or articles of substandard length. Flights of the conveyor are equipped with stops against which the ears move lengthwise into endwise abutment. Accordingly consistent discharge of ears, of an acceptable length, are delivered to the remaining or orientating portion of the machine.

The orientating portion of the machine serves to at least initiate orientation of the articles by impeding the gravitating of the article's larger or butt end while the smaller end advances therepast towards an upright surface moving transversely to the article's path and which acts on the lowermost leading end of the article to complete article orientation. The article is then acted on by reciprocating article aligning means which compensates for different article orientation times and simultaneously lifts aligned and like orientated articles onto a conveyor for further processing.

Important objectives of the present machine include the provision of a machine providing high speed, consecutive delivery of like orientated, tapered articles linearly into a processing machine; the provision of a machine including a flight conveyor which serves to provide a continuous supply of tapered articles to the orientating portion of the machine while discharging articles of substandard length; the provision of a machine including a flight conveyor in which certain flights are equipped with powered article positioning means for moving an article along the flight toward a flight mounted stop; the provision of a machine incorporating an oscillating hinged plate structure which acts on a gravitating article to impede the larger end thereof while permitting the advancement of the smaller end; the provision of a machine having an article orientating component including an inclined surface moving transversely to the path of the article and contactable by one end of the article being orientated to deflect said end in a desired direction; the provision of a machine having article aligning means which serves to momentarily delay an article to assure contemporaneous delivery of at least two axially aligned articles to a conveyor delivering the articles for further processing; the provision of a machine having a high efficiency rate of article orientation while achieving orderly delivery of consecutive articles to a processing machine; the provision of a machine which achieves article orientation prior to discharge of the article onto an outfeed conveyor.

BRIEF DESCRIPTION OF THE DRAWINGS

In the accompanying drawings:

FIG. 1 is a perspective view of the present machine;

FIG. 2 is a side elevational view of the machine taken approximately along line 2—2 of FIG. 1 with an opposite side view being substantially a mirror image;

FIG. 4 is a plan view taken downwardly along line 4—4 of FIG. 3 showing adjacent conveyor flight upper edges; and FIG. 5 is a vertical sectional view taken along line 5—5 of FIG. 3.

DETAILED DESCRIPTION OF THE PREFERRED EMBODIMENTS

Figure 3:
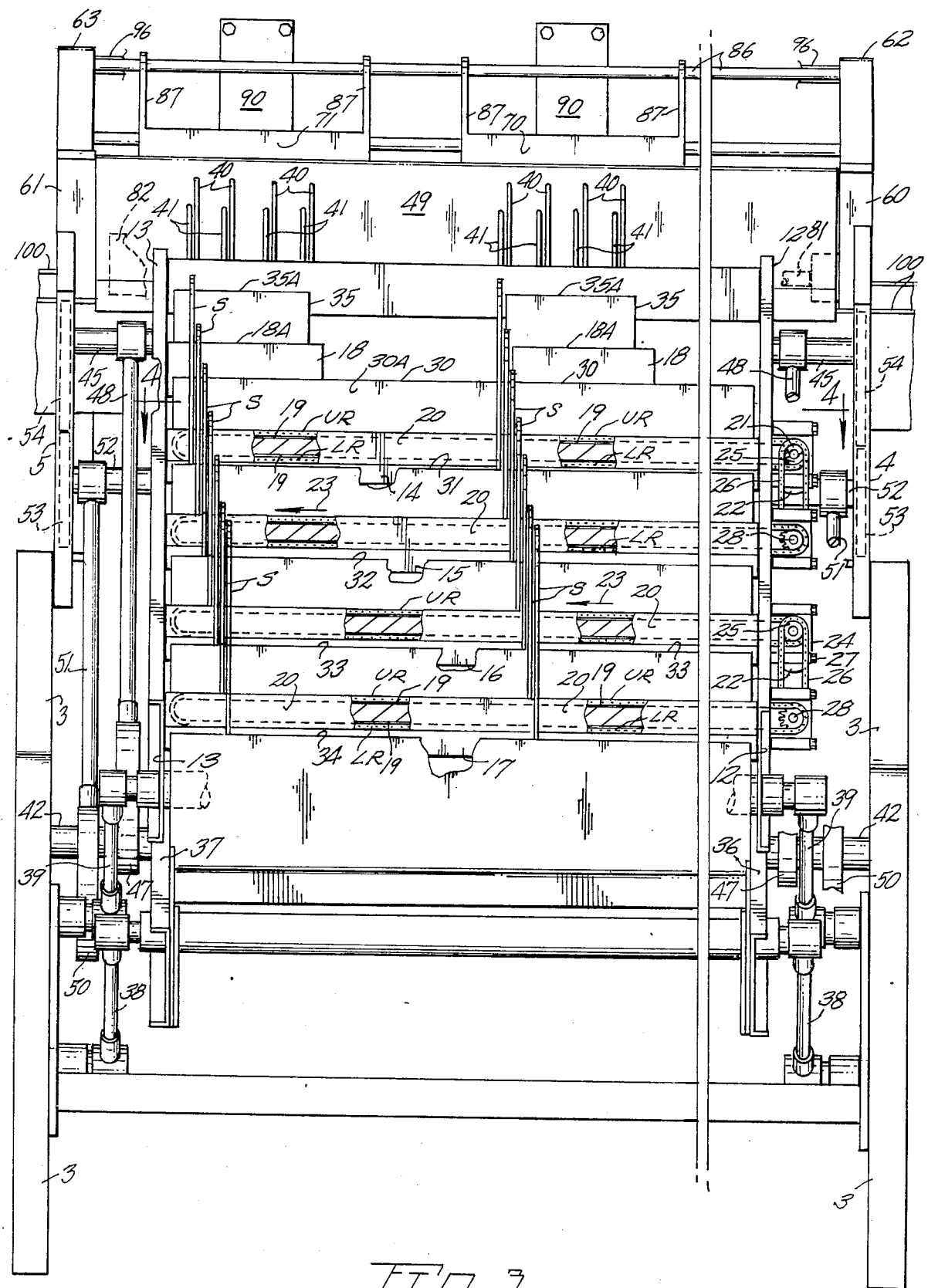
FIG. 3 is an enlarged front elevational view of the machine taken from the left-hand side of FIG. 2.

With continuing attention to the drawings wherein applied reference numerals indicate parts similarly hereinafter identified, the reference numeral 1 indicates generally the conveyor portion of the present machine having its lowermost end in receiving communication with a belt conveyor 2 on which articles to be processed are delivered.

A machine frame includes welded side and leg components at 3 joined by suitable cross members. The frame sides are equipped with upright plate structures 4 and 5. The frame supports a bin structure including a receiving chute 6 and side wall structures 7 which confine the mass of randomly delivered articles until conveyor pick up.

As best viewed in FIGS. 2, 3 and 4 in conveyor portion 1 of the machine, which may be termed a flight or shuffle conveyor, articles are elevated by transfer in sequence from one reciprocating conveyor member to a second, oppositely reciprocating member with the article gravitating from said one member to said second member when article bearing surfaces thereon are momentarily coplanar. Such flight or shuffle conveyors are widely used in food processing plants.

A first or upper reciprocating frame structure of the conveyor is indicated generally at 10 while a companion or lower reciprocating frame structure is generally at 11. The first mentioned upper frame structure 10 includes inclined side plates 12 and 13 which carry flights 14–17 extending therebetween and spaced apart for the interspersed reception of later described lower frame flights. A flight 18 is segmented to provide two surface areas at 18A each being of a length to adequately support only a single article. Flights 14, 15, 16 and 17 of the upper reciprocating frame are each equipped with later described article positioning means for the purpose of moving an article lengthwise along the flight upper edge towards or into endwise abutment with a barrier or stop S on the flight. A description of one article positioning means will suffice for all as each typically includes a continuous roller chain circuit having an upper run UR and a lower run LR with the chain runs recessed within lengthwise extending channels 19 in a block 20 of low friction type synthetic material suitably secured in place to constitute the upper edge of upper frame flights 14, 15, 16 and 17. The chain length member is driven in a continuous manner by a sprocket 21 powered by a hydraulic motor 22 with the upper chain runs UR moving to the left as viewed in FIG. 3 per arrow 23. A motor mount 24 is secured to conveyor frame side plate 12 by bolts 27. Each motor 22 also drives article positioning means via a sprocket 25, a transfer roller chain drive 26 which drives a multiple sprocket equipped shaft 28 in a bearing 29 on conveyor side plate 12.

The lower reciprocating frame structure, generally at 11, of the flight conveyor is equipped with flights 30 through 34 with an upper flight at 35 being segmented with the segments each having a surface at 35A to support but one of the conveyed articles. The lower frame flights project upwardly from the lower frame side plates 36 and 37 with each lower frame flight projecting between a pair of upper frame flights. The lower frame is swingably carried by a pair of pivotal support links 38 while an upper pair of similar links 39 supports the upper frame. The segmented or partial flights 18 and 35 define, along with flight 30, open areas through which excess articles may gravitate onto a chute at C for return to conveyor 2 by means not shown.

The upper and lower reciprocating frame structures 10 and 11 each have spaced apart discharge flights at 40 and 41 which may be of wire finger construction to permit article fragments to pass downwardly therethrough to prevent their delivery to the orientating portion of the machine. Flights 40 simultaneously lift the singular articles thereon along a fixed, inclined surface 49.

A drive motor at M in FIG. 2 for the flight conveyor is suitably mounted on machine frame mounted plate 3A and drives a cross shaft 42 via a chain 43. Shaft 42 is journalled in frame carried bearings as at 44 and drives pairs of diametrically offset eccentrics at 45 and 46. Followers 47 on eccentrics 46 impart reciprocating motion to connecting rods 48 which terminate upwardly in journalled engagement with a first pair of stub shafts as at 45 each shaft affixed to and projecting outwardly from side members 12 and 13 of the upper frame structure 10. Similarly followers 50 on eccentrics 45 drive connecting rods 51 which are in journalled engagement with a second pair of outwardly projecting stub shafts as at 52 on lower frame side members 36 and 37. The outer ends of the stub shafts are constrained for upright reciprocal motion in pairs of guides as at 53 and 54 in place on the inner sides of frame mounted plate structures 4 and 5. Step-like transfer of the articles occurs when the flights upper surfaces are coplanar to permit the article to roll onto the lower flight edge. As viewed in FIG. 4, the upper chain runs UP travel in close proximity to an upright flight surface 30A of an adjacent flight to assure contact of the periphery of the tapered article with the upper chain run. The offset between chain run and flight surface 30A would be determined by article diameter. The uppermost surfaces of the flights are inclined approximately 25 degrees off the horizontal to assure adequate frictional contact of the article with the upper chain run for article positioning by the chain toward the side of the left flight conveyor as viewed in FIG. 3. It will be apparent that the upper edges or surfaces of certain flights may be equipped with other article positioning means such for example a driver member comprising a lead screw with article engaging threads advancing the article along a flight and toward a side of the conveyor and for ultimate delivery to a conveyor flight adapted to convey a singular article to the conveyor.

The orientation portion of the machine, generally indicated at 57, receives elongate tapered articles from conveyor flight 40 which is comprised of two horizontally spaced series of fingers which permit downward passage of article fragments. The orientation portion is supported by a frame superstructure in place on frame 3 and includes tubular posts 60-61 which have inclined lower segments and verticle upper segments and on which are mounted pinch plate supports at 62-63. Posts 60-61 are braced by gussets as at 64 terminating downwardly also in securement to machine frame 3. Secured between posts 60-61 is a cross member angle 65. Bolted at 66 to said angle is an oscillating plate structure generally at 67 constituting part of article retention means which receives and retains articles gravitating from conveyor discharge flight 40. Said plate structure has an inclined section 68 for article reception and an upright section 69 adapted for oscillating motion toward and away from a pair of pinch plates at 70 and 71 of the article retention means. A base section 72 is secured to cross member 65 by fasteners 66.

Uppermost section 68 of the plate structure has a top edge 68A slidably confined within flanges 73 and 74 on fixed plate 49. Extending lengthwise of the plate structure is a hinge 75 formed by a kerf 79 which provides an area of flexure by reducing the plate to a flexible sectional width. A protective wear plate is at 80. Upright section 69 of the plate structure carries a friction enhancing strip 76 such as one of sintered abrasive particles and is bolted at intervals at 77. In place along lengthwise segments of upright section 69 are cam follwers 78 driven by cams as at 80 on a cam shaft 81 driven by a hydraulic motor 82. A motor mount is at 83. A second hinge or area of fluxure is at 85 of the plate structure and is formed by a reduced sectional width or kerf at 84 the juncture of the upright section and the base section. Continuous rotation of cam shaft 81 imparts a substantially horizontal, oscillating motion to upright section 69 with inclined section, being constrained at its upper edge, for reciprocation in an inclined plane common to the inclined section. The cam shaft oscillates upright plate 69 through about 0.060 of an inch of travel to pinch and release each article several times as the article descends between the plate section 69 and the opposed pinch plate 70 or 71 as later described.

Pinch plates at 70 and 71 of the article retention means are yieldably carried by a rod 86 extending intermediate pinch plate supports 62-63. Hangers 87 depend from rod 86 and carry each pinch plate in a manner permitting yielding of the plates in response to a gravitating article being acted on by oscillating upright plate section 69. The pinch plates are spaced apart along support rod 86 so as to assure plate contact by articles delivered by discharge conveyor flights 40. Each pinch plate 70-71 is biased toward the oscillatory plate structure by biasing means shown as a pair of fiberglass leaf springs 90-91 with bearing blocks 93 at their lowermost ends in sliding contact with the pinch plate bottom edge. Each pair of leaf springs is carried by a bracket 94 having a boss 95 for the reception of a supporting rod member 96 with the rod member ends being suitably journalled in pinch plate supports 62-63. The rod member is provided with arms as at 97 to facilitate rotational adjustment of the rod member with the arm thereafter clamped by fastener 98 to pinch plate support 62 and 63. Accordingly a desired biasing action on the pinch plates may be exerted by the adjustable leaf springs 90-91. If desired, rod 96 may be segmented with an arm for each rod segment to permit individual biasing adjustment of the pinch plates by positioning of an arm or arms 97.

Disposed below the pinch plates is an inclined endless belt 100 constituting article displacement means. Belt live and idler rolls 101-102 (FIG. 1) are suitably journalled in clevis shaped supports 103-104 with an inclined belt surface 100A located so as to be obliquely contacted by articles released from the above described oscillating plate structure. A hydraulic motor 105 drives roll 101 to move belt surface 100A transversely to the path of descending articles whereby the leading smaller end of the article is displaced in the direction of belt travel per arrow 109. Positionable belt support bars 107-108, in FIG. 5, provide belt supporting surfaces as well as enable fine inclinational adjustment of the belt surface 100A contacted by the article. For this purpose the bars include studs 110 and 111 locked by set screws 112. Blocks at 113 on posts 60-61 of the frame superstructure are apertured to receive the studs. Motor 105 drives the belt within a range of 90 to 160 fpm when the machine is used for orientating ears of corn. To assure belt retention on live and idler rolls 101 and 102 the belt is provided with an internal rib 114 which rides within an annular recess (not shown) in each roll. Hydraulic motor 105 is readily adjustable to provide the desired belt speed.

From the foregoing description it will be apparent that tapered articles, and particularly the larger end thereof, will be contacted and released by the oscillating plate structure and cooperating pinch plate several times during passage therepast to permit the reduced end of the tapered article to advance somewhat ahead of the detained larger end of the article to cause the smaller end to initially contact belt surface 100A. The moving belt surface imparts lateral displacement to the article smaller end in the direction of belt travel to assure like orientating of all articles contacting and discharged by the belt. The foregoing is true even though the article may have its smaller end directed opposite to the direction of belt travel as the belt will cause the article to swing in pendulum fashion through vertical about its momentarily detained larger end.

Located so as to receive the tapered articles from belt 100 is a sloped wall surface 115 carried by a pair of end brackets 116 integral with machine frame superstructure. Articles approaching wall surface 115, upon belt discharge, will be substantially horizontal or at least inclined to the horizontal to the extent the article will roll down wall 115 for momentary arrest against article aligning means at 124. Said aligning means, with reference to FIG. 2, will be seen to be conveniently carried for timed cycling by reciprocating lower frame 11 of the flight conveyor. The extremes of travel for article aligning means 124 is shown in FIG. 5 in single dot and double dot lines with the lower single dot line position allowing the articles to roll into place on uppermost surface 124A and the elevated double dot line position permitting the aligning articles to move into a chain conveyor trough 125. Upper or ear lifting surface 124A is of a narrow width, as viewed in FIG. 5, to elevate only aligned articles. an ear arresting surface at 124B serves to momentarily delay a following ear until it may roll into place onto lowered ear lifting surface 124A.

In a machine provided with two oscillating plate structures and cooperating pinch plates, properly orientated and aligned articles will come to rest momentarily against surface 124B at or near the same time with subsequent lowering of aligning means 124 permitting the articles to roll into place on surface 124A whereon they are simultaneously elevated and discharged onto a chain conveyor 106. Importantly, article aligning means 124 compensates for slightly different orientation times of two articles by providing a momentary delay to permit the last orientated article of a pair of articles to roll into place onto surface 124A. From the foregoing it will be understood that the flight conveyor delivery of multiple articles to the orientation portion of the machine and the unloading of said orientation portion are synchronized by reason of article aligning means 124 being timed with conveyor discharge flight 40. Accordingly articles are placed onto conveyor 106 without conflict with an upstream loaded article.

Chain conveyor 106 is of the type used in food article processing equipment and includes wing-like extensions on roller chain side plates which extensions are slidably supported by inclined surfaces 127A and 127B of a conveyor base 127. Supports as at 128 carry a panel 128A and the conveyor trough and terminate downwardly in attachment with a frame component of the machine.

For delivering orientated ears of corn to a kernel cutting machine generally at 130 in FIG. 1, conveyor 106 may be driven by a sprocket 131 which is conveniently powered through a power take-off arrangement from machine 130. Chain speed will be proportional to the rotational speed of the blade mechanism within the machine housing at 132. Machine 130 may be of the type manufactured and sold by a division of the FMC Corporation. Slight modification to machine 130 includes the installation of the aforementioned power takeoff arrangement. A motor control 133 for the cutter machine motor at 134 includes stop, start and reverse motor controls to permit the direction of conveyor chain 106 to be stopped or reversed in the event it becomes necessary to clear ears of corn from cutter blade housing 132. The kernels removed are discharged downwardly from housing 132 via chute 136 onto a conventional conveyor (not shown) for a subsequent processing operation while the cobs are discharged through a housing outlet 135. If desired, electronic monitoring means of conveyor 106 may be utilized to automatically interrupt and reverse conveyor and cutter machine motor operation in the event an ear of corn departs from the desired chain carried course into housing 132.

In one satisfactory embodiment of the present machine, uppermost section 68 and upright section 69 of the oscillating plate structure 67 may be formed from a synthetic material such as high density polyurethane. The inclination of belt surface 100A, by earlier described means, permits the machine to accommodate tapered articles of a range of lengths. When processing relatively short articles for example the inclination away from the verticle will be increased.

While we have shown but a few emodiments of the invention, it will be apparent to those skilled in the art that the invention may be embodied still otherwise without departing from the spirit and scope of the invention.

Having thus described the invention, what is claimed and desired to be secured in a Letters Patent is:

1. A machine for orientating elongate tapered articles and positioning of same into mutual alignment for subsequent processing, said machine comprising,
   aconveyor component having a multitude of reciprocating flights for elevating and discharging singular axially spaced tapered articles, at least some of said flights having article positioning means for imparting movement to the articles along their axes and transversely to their conveyed path, said article positioning means including a power source and a driven member disposed lengthwise on the flight and acting on the articles being conveyed, at least some of said flights including stops against which the articles may be endwise abutted,
   article orientating means receiving said articles and including retention means acting on the large end of each article to slow gravitational movement of said end to cause tipping of the article axis off the horizontal, article displacement means located below said retention means and having a moving surface for travel generally transverse to the gravitational course of the article for contact by the smaller end of the article whereby the smaller end will be displaced in the direction of travel of said moving surface ahead of the larger end of the article, and
   article aligning means acting on at least two of said articles to support same in alignment with one another for subsequent article processing.

2. The machine claimed in claim 1 wherein some of said flights are comprised of fingers to permit gravitational discharge of article fragments.

3. The machine claimed in claim 1 wherein some of said flights are of lesser width than a subjacent flight to provide a flight defined open area through which excess articles may pass for removal of same from the conveyor.

4. The machine claimed in claim 1 wherein said article displacement means includes a powered belt having a run with a substantially upright surface located subjacent said retention means.

5. The machine claimed in claim 4 wherein said article displacement means includes adjustable belt supporting members whereby the inclination of the upright surface of the belt may be varied.

6. The machine claimed in claim 1 wherein said retention means includes a plate structure, means imparting oscillatory substantially horizontal motion to said plate structure, said plate structure having an area of flexure adapted to flex during oscillation to provide plate sections for oscillatory travel along different vectors.

7. The machine claimed in claim 6 wherein said plate structure includes a stationary section.

8. The machine claimed in claim 6 wherein said plate structure is of a synthetic material having kerfs formed therein to provide areas of flexure.

9. The machine claimed in claim 1 wherein said article aligning means includes a planar article arresting surface against which multiple articles may come into align arrested contact, said article alinging means coupled to and driven by said conveyor component to synchronize article movement through the machine.

10. The machine claimed in claim 9 wherein said article aligning means additionally includes a reciprocating lifting surface for simultaneous lateral transfer of the aligned articles.

11. The machine claimed in claim 10 additionally including a conveyor receiving the laterally transferred articles, said conveyor in discharging communication with subsequent article processing equipment.

12. In combination,
   conveyor means for the lateral discharge of elongate tapered articles,
   article orientating means receiving the articles and having opposed horizontally spaced apart components between which the articles pass, said components retarding the downward passage of the larger end of the elongate tapered article to incline the major axis of the article, said article orientating means including an oscillating flexible plate structure having upright and inclined sections, means acting on said plate structure and imparting horizontal oscillating motion thereto, a continuously moving surface subjacent said plate structure and moving in a direction transverse to a projected downward course of the article and serving to displace the lowermost end of the article in said direction, and article aligning means driven by said conveyor means and serving to mutually align like orientated tapered articles received from said article orientating means, said article aligning means having an article arresting surface and an article lifting surface.

13. The combination claimed in claim 12 wherein said conveyor means is a flight conveyor having reciprocating upright flights moving in parallel with one another, article positioning means including powered means in place along the upper extremity means of said flights to move an article in a lengthwise direction along the flight.

14. The combination claimed in claim 13 additionally including stops on said some of said flights to limit article movement 15. The combination claimed in claim 13 wherein some of said upright flights are of lesser length than other of said flights to reduce the number of articles conveyed by the flights.

16. The combination claimed in claim 12 additionally including motor and cam means imparting oscillatory motion to one of said plate components.

17. A machine for orientating elongate tapered articles and positioning of same into mutual alignment for subsequent processing, said machine comprising, a conveyor component having a multitude of reciprocating flights for elevating and discharging singular axially spaced tapered articles, at least some of said flights having article positioning means for imparting movement to the articles along their axes and transversely to their conveyed path, said article positioning means including a power source, a driven member coupled to said power source and disposed lengthwise on the flight and acting on the articles being conveyed, some of said flights including stops against which the articles may be endwise abutted, article orientating means acting on the tapered articles to tip same into a generally upright position, article displacement means having a moving surface for travel transversely to the path of the articles to advance the lower end of the article ahead of the remaining end of the article, and article aligning means simultaneously acting on at least two articles to support same in alignmnt with one another for subsequent article transfer to a conveyor.

18. The machine claimed in claim 17 wherein said driven member is an endless chain.

19. The machine claimed in claim 17 wherein some of said flights are of lesser length than other of said flights to cause excess articles to be discharged through open areas adjacent the flights of lesser lengths.

20. The machine claimed in claim 19 wherein some of said flights are of finger construction to cause the discharge of article fragments.

21. A shuffle conveyor comprising in combination, a frame, upper and lower frames structures supported within said frame for reciprocating movement, each of said frames having crosswise disposed flights, a motor coupled to said upper and lower drive frames to reciprocate same, article positioning means on some of said flights, said positioning means including a power source, a driven member coupled to said power source and disposed lengthwise on the flight and serving to move conveyed articles along the flight toward a flight extremity, stops on said some of said flight to limit article movement therealong.

22. The shuffle conveyor claimed in claim 21 wherein certain of said flights are of a length to support but a single article being conveyed and partially define open areas for the gravitational discharge of excess articles.

23. The shuffle conveyor claimed in claim 21 wherein said driven member is an endless chain.

24. The shuffle conveyor claimed in claim 21 wherein some of said flights are of finger construction to permit the discharge of fragments of articles being conveyed.

* * * * *